United States Patent
Parkin et al.

(10) Patent No.: US 6,930,832 B1
(45) Date of Patent: Aug. 16, 2005

(54) STRAP DESIGN FOR TILED REAR PROJECTION SCREENS

(75) Inventors: John Parkin, Kitchener (CA); O. Nicholas Komarnycky, Kitchener (CA)

(73) Assignee: Christie Digital Systems, Inc., Ontario (CA)

( * ) Notice: Subject to any disclaimer, the term of this patent is extended or adjusted under 35 U.S.C. 154(b) by 0 days.

(21) Appl. No.: 10/913,452

(22) Filed: Aug. 9, 2004

(51) Int. Cl.[7] ............................ G03B 21/56; H04N 5/64
(52) U.S. Cl. .......................... 359/449; 359/460; 348/840
(58) Field of Search .......................... 359/443, 449, 359/460; 348/836, 840, 789

(56) References Cited

U.S. PATENT DOCUMENTS

| | | | |
|---|---|---|---|
| 4,866,530 A | 9/1989 | Kalua | 348/383 |
| 4,919,518 A | 4/1990 | Ogino et al. | 359/457 |
| 5,011,277 A | 4/1991 | Ogino et al. | 353/94 |
| 5,467,221 A | 11/1995 | Iwahara et al. | 359/449 |
| 5,818,639 A * | 10/1998 | Furuya | 348/836 |
| 6,113,041 A * | 9/2000 | Mannick | 348/789 |
| 6,327,082 B1 * | 12/2001 | Browning | 359/443 |
| 6,574,040 B1 * | 6/2003 | Gosling et al. | 359/443 |
| 2004/0111132 A1 * | 6/2004 | Shenderova et al. | 607/88 |

* cited by examiner

Primary Examiner—Christopher Mahoney
(74) Attorney, Agent, or Firm—Staas & Halsey LLP

(57) ABSTRACT

An improved strap design is provided for to reducing edge reflections in tiled video cubes. More particularly, a groove is notched on the outside of the strap into which bonding compound is injected for bonding the screen mounting surface to the video cube. In addition to eliminating edge reflections, the new strap design also provides a clearer bond, without voids and cutting debris trapped between the side strap and clear screen mounting surface. Crazing is also reduced with the new bond, and there is no excessive machining requirement to create the groove in the strap, thereby saving on construction time.

4 Claims, 5 Drawing Sheets

STRAP DESIGN FOR TILED REAR PROJECTION SCREENS

BACKGROUND OF THE INVENTION

1. Field of the Invention

The present invention relates generally to rear proton screens, and more particularly to a new strap design to reduce edge reflections in tiled rear projection screens.

2. Description of the Related Art

Video walls comprising multiple tiled video screens are known in the art, wherein multiple individual video display devices (i.e. cubes) are vertically and horizontally stacked to create a cube wall (e.g. see U.S. Pat. No. 5,467,221 (Iwahara et al); U.S. Pat. No. 4,866,530 (Kalua); U.S. Pat. No. 4,919,518 (Ogino et al) and U.S. Pat. No. 5,011,277 (Ogino et al). The conventional cube wall is arranged with cubes placed squarely one on top of another and side-by-side. The video screens are closely edge aligned, both vertically and horizontally, to provide a uniform video wall with an apparently seamless structure. Light distribution is an important component in creating a uniform wall and is controlled through specific optical structures within the various screens.

Each cube comprises a metal frame for housing the optical structures and a rear proton video screen mounted on a clear, acrylic surface. A thin, flexible acrylic strap extends around top, bottom and side edges of the frame adjacent the screen edge to provide structural integrity to the cube. The strap is bonded to the mounting surface via an open channel created by a rabbet cut in the acrylic strap adjacent the screen. The rabbet cut creates a channel that functions as a reservoir into which liquid methylene chloride is permitted to flow during bonding.

One disadvantage of such video screens is the occurrence of first and second order reflections at the edges of the screen. First order reflections result from optical interference as incident light intercepts the channel region where the dear acrylic mounting surface is bonded to the strap. Second order reflections occur when the projection image is over-scanned beyond two pixels, such that the projected light becomes incident on the inside edge of the strap.

SUMMARY OF THE INVENTION

It is an aspect of the present invention to provide an improved strap design to reduce edge reflections. More particularly, the new screen design eliminates the bonding channel from the inside edge of the perimeter strapping, and replaces it with a groove on the outside of the strap. In addition to eliminating edge reflections, the new strap design also provides a clearer bond, without voids and cutting debris trapped between the side strap and clear acrylic. Crazing (a network of fine cracks running on, or slightly under, the surface of plastic materials) is also reduced with the new bond. Furthermore, eliminating the prior art requirement of machining the rabbet cut in the strap saves construction time.

These together with other aspects and advantages, which will be subsequently apparent, reside in the details of construction and operation as more fully hereinafter described and claimed, reference being had to the accompanying drawings forming a part hereof, wherein like numerals refer to like parts throughout

DETAILED DESCRIPTION OF THE PREFERRED EMBODIMENTS

Figure 1:
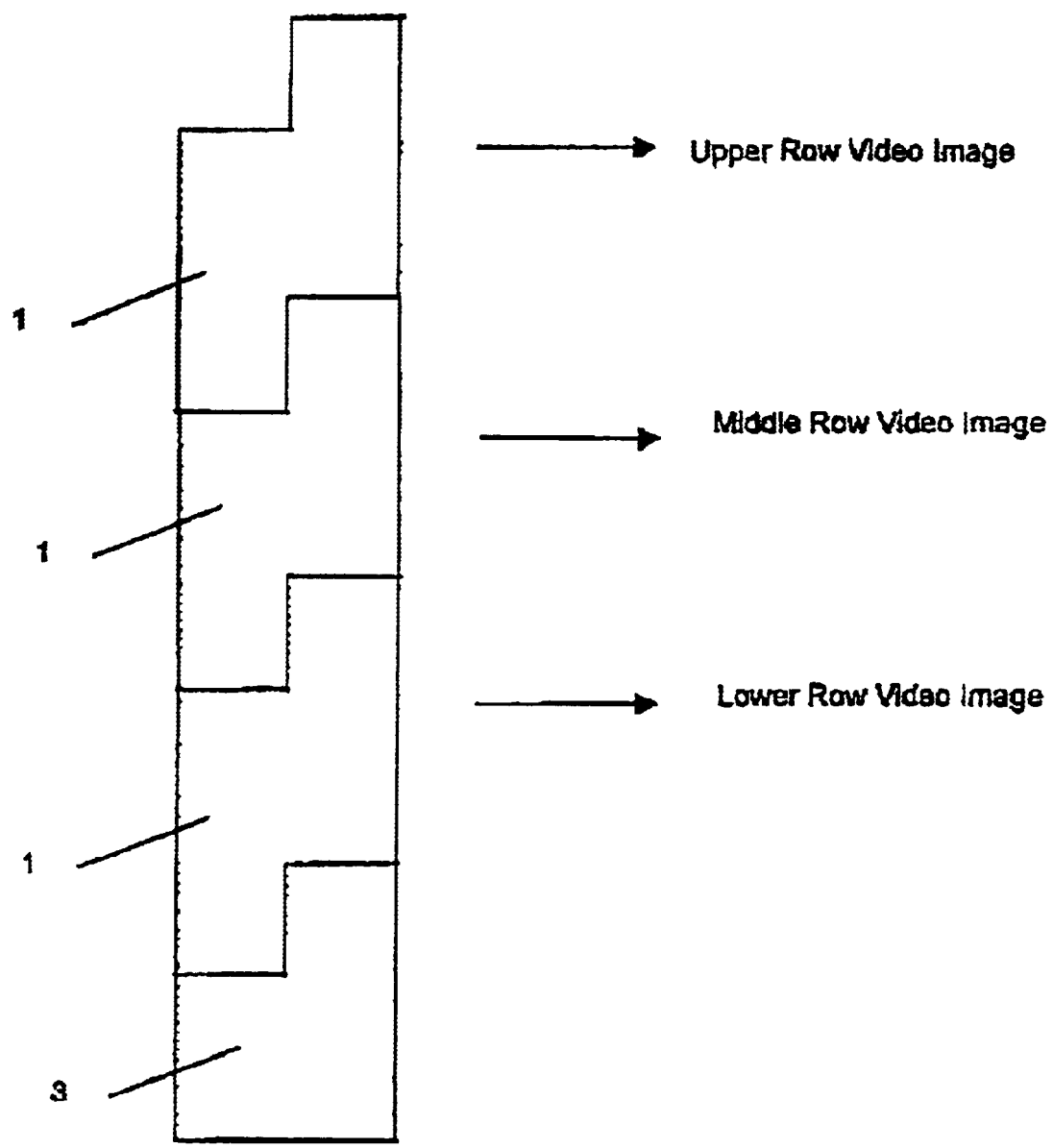
FIG. 1 is a side schematic view of a video wall constructed from a plurality of video cubes, as is known in the art.

FIG. 1 is a side view of a conventional cube wall arranged with video cubes 1 placed squarely one on top of another, with the lowest cube optionally being supported by a base 3. Three rows of cubes are shown, although a fewer or greater number of cubes may be stacked to form the wall. Although not shown in the side view of FIG. 1, an equal number of (e.g. three) columns are arranged beside the cubes 1 to form a wall of 3×3 video cubes.

Figure 2:
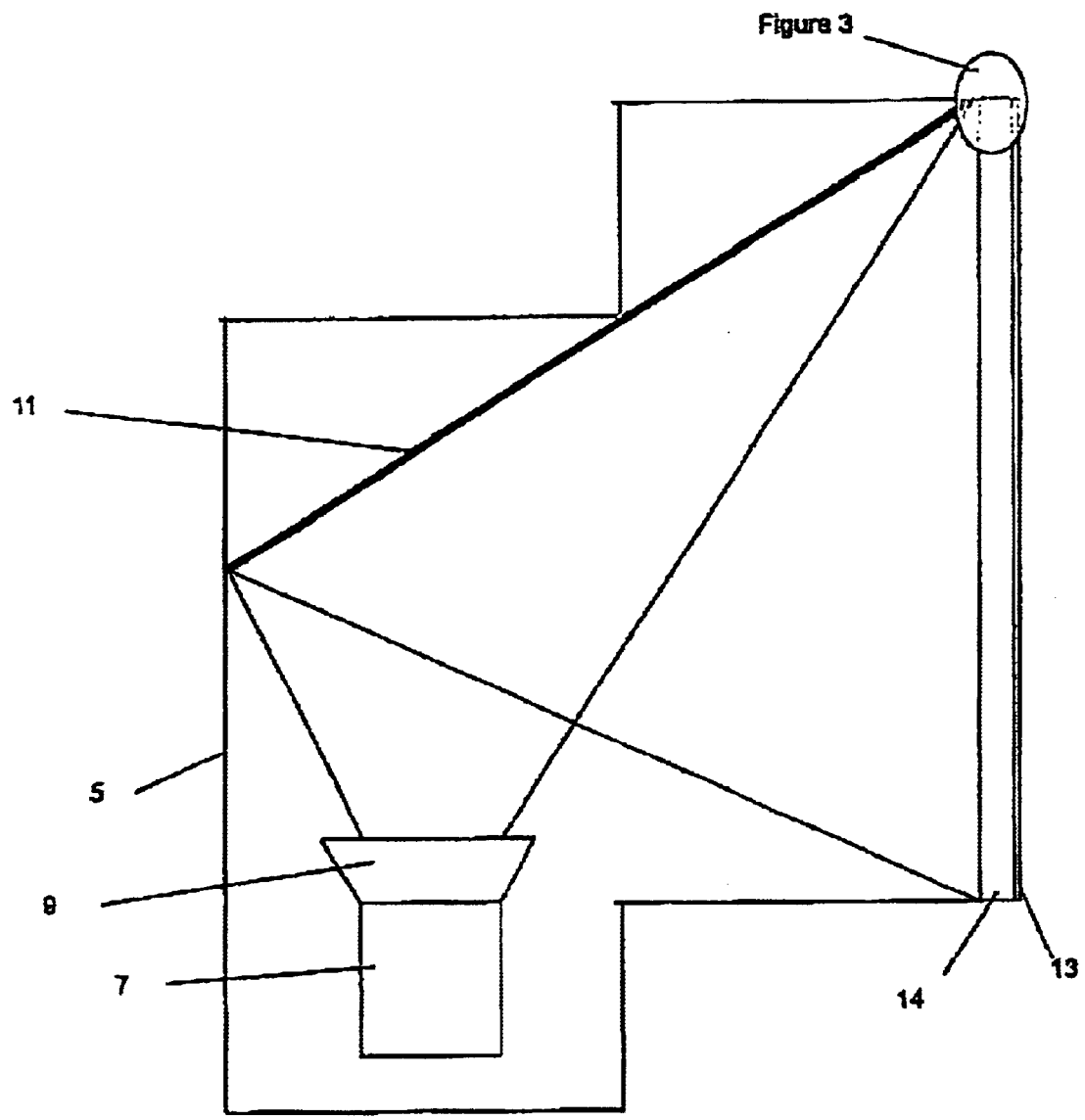
FIG. 2 is a detail schematic representation of a single video cube of FIG. 1.

As shown in FIG. 2, each video cube comprises a metal frame 5 incorporating a light engine 7, projection lens 9, fold mirror 11, and rear projection screen 13. The screen 13 is positioned directly over a dear acrylic surface 14. The screen 13 and clear acrylic surface 14 are held firmly together with a thin polyester film tape, which wraps around the outside edges of both elements. Clear acrylic surface 14 is bonded to edge strap 15 circumscribing the frame 1, as shown in greater detail with reference to FIG. 5. The side straps 15 are bolted to metal frame 5 in an area where the projected light is not incident to the outside edge so that the bolts do not obstruct the image. Different screens 13 may be mounted to the surface 14 depending on the desired application (e.g. high gain, wide angle, etc.)

Figure 3:
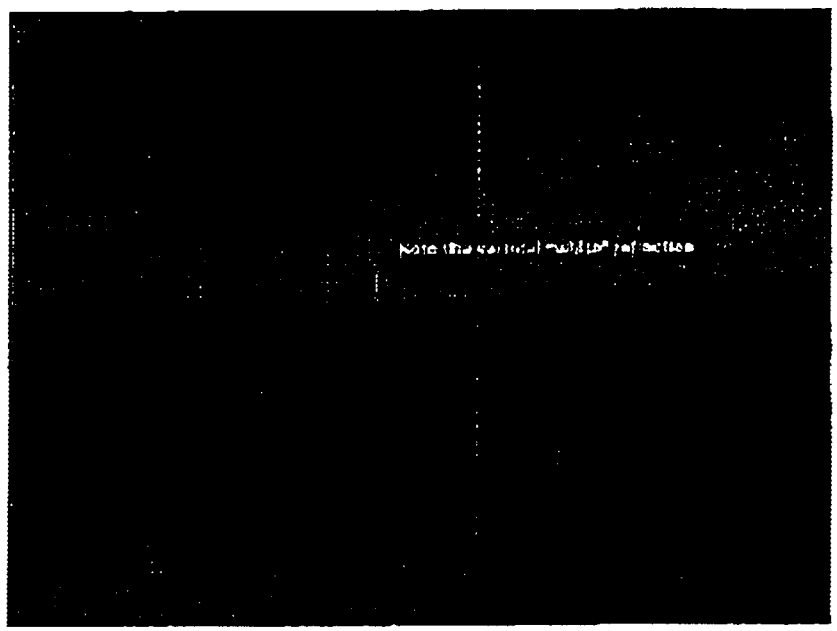
FIG. 3 is a detail of FIG. 2 (rotated 90° clockwise from FIG. 2) showing a strap with channel into which methylene chloride is injected for bonding the screen to the video cube, according to the prior art.

The mirror reflects light rays of the image from lens 9 to the extreme edges of the screen 13, thereby forming a seamless image at the screen edges. In fact, physical tolerances result in an approximately 1 mm. gap between adjacent screens, which is not visible to the human eye at normal viewing distances. Moreover, as discussed in greater detail below, the manner in which the surface 14 is bonded to the reinforcing strap results in generation of edge reflection artifacts, as shown in FIG. 3.

Figure 5:
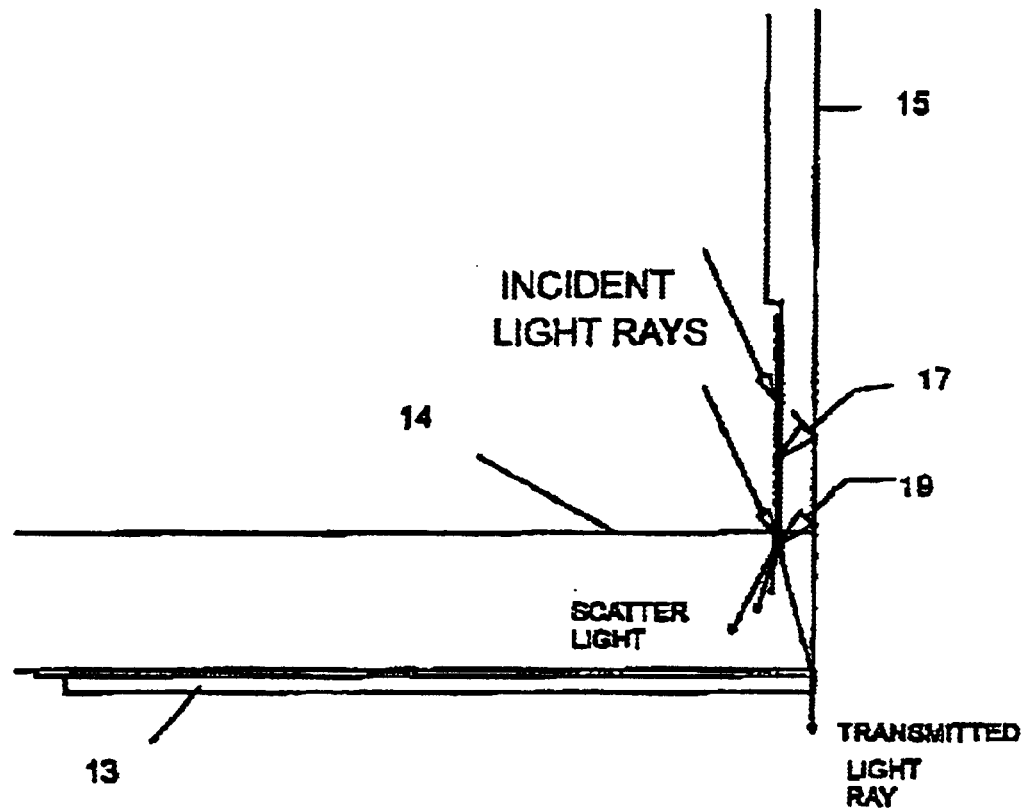
FIG. 5 shows air cavities in the channel formed by the methylene chloride.

FIG. 5 is a detail from FIG. 2 of the interface between acrylic surface 14 and edge strap 15. It will be noted that that the screen 13 includes a fresnel lens adjacent the clear acrylic 14.

As shown in FIG. 5, strap 15 provides a mechanical interface between the clear acrylic surface 14 and the metal frame 5, and provides structural rigidity so that the structure can be moved. When the projection image is over-scanned beyond two pixels, the projected light becomes incident on the inside edge of the strap, giving rise to second order reflections. Second order reflections occur between 2 and 10 pixels of over scan, and have the appearance of long and straight bands of light. The bands run parallel to the screen edge and are located approximately ½ to 1 from the screen edge.

in order to prevent these specular reflections, a surface roughness 17 is machined into the strap to absorb some of the incident rays and thereby prevent light scattering.

A channel 19 is machined into the strap 15 via a rabbet cut along the outside edge of the dear acrylic layer 14. The purpose of the rabbet cut is to create an open channel immediately adjacent to the strap 15. The channel functions 19 as a reservoir into which liquid methylene chloride is permitted to flow during bonding, while preventing the methylene chloride from running into the visible regions of the screen.

Figure 4:
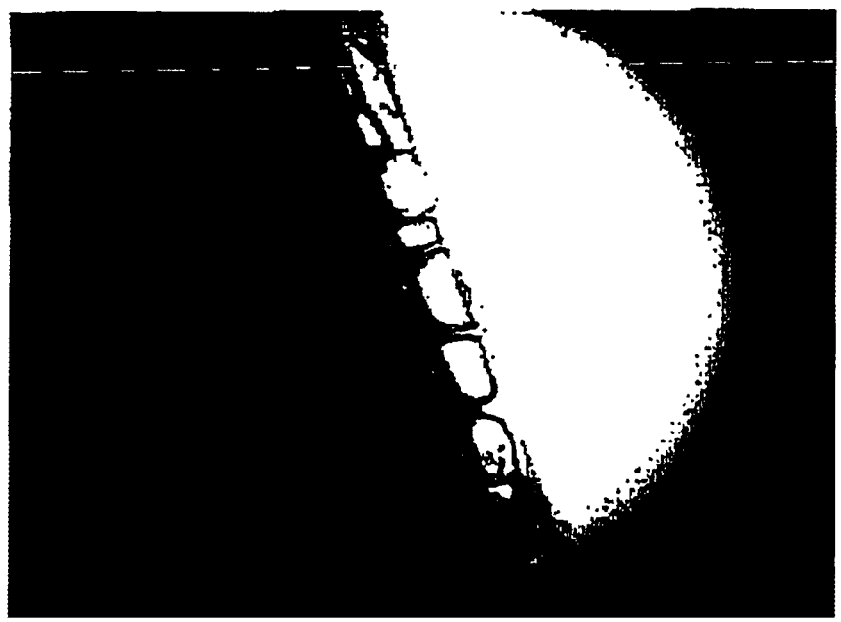
FIG. 4 shows edge reflection of an image using a video cube with the bonding strap of FIG. 3

First order reflections are created as incident light intercepts the channel region 19 of the dear acrylic layer 14. The channel includes air cavities formed by the methylene chloride, infused bubbles and trapped cutting debris, as shown in FIG. 4. These irregular features scatter projection light and lead to the first order reflections.

These first order reflections occur between 0.5 and 2 pixels of over-scan, and appear as diffuse, oval shaped patches of light The reflections appear in various sizes from ¼ to several inches long and are orientated with the long axis parallel to the screen edge. They are located approximately ½ in from the screen edge.

Figure 6:
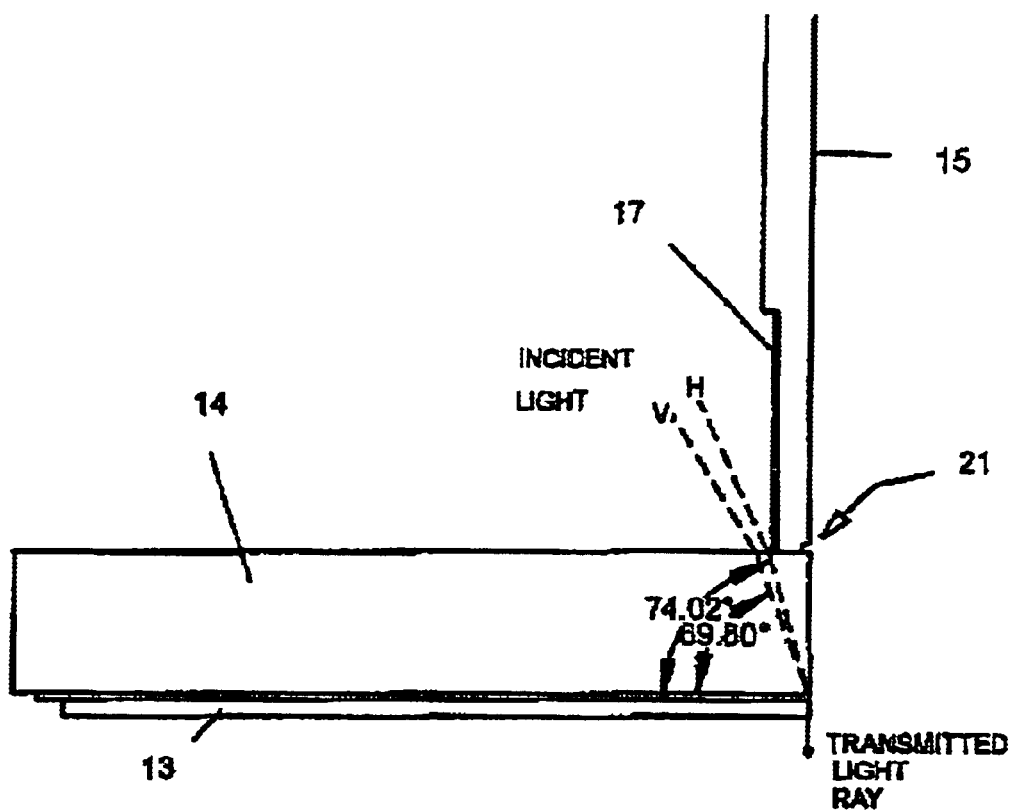
FIG. 6 is a detail view showing a strap with groove for bonding the screen to the video cube, according to the present invention.

According to the present invention, as shown in FIG. 6, the methylene channel 19 is eliminated from the inside edge of the perimeter strapping, and replaced by a groove 21 detailed on the outside of the strap 15 for bonding purposes. The location of the groove 21 on the outside surface of the strap 15 does not interfere with horizontal (H) and vertical (V) light rays impinging on the junctions between the strap 15 and acrylic layer 14. Consequently, first order reflections are entirely eliminated. Also, a cleaner bond is provided than with the channel 19, without voids and cutting debris trapped between the strap 15 and clear acrylic 14. In addition, crazing is reduced since the groove 21 is merely notched into the strap 15, rather than being machined into the clear acrylic layer 14. Moreover, since machining of the dear acrylic is not required, the cutting process time is reduced when compared to the structure of FIG. 5.

The usual rough surface 17 is machined into an indentation on the inside of the strap 15 to eliminate second order edge reflections.

One additional advantage of the invention is that by eliminating the channel 19 on the inside edge, a thinner clear acrylic 14 sheet thickness may be used. This is because there is no need to factor in the additional width of the channel 19 in calculations of lateral clearance with the projected light. As shown in FIG. 5, clearance of projected light must be provided for the sum of edge of strap 15 and width of channel 19. By using a thinner clear acrylic 14, there is a reduction in the weight of the completed screen and reduced cost of the clear acrylic 14.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. In a rear projection video cube for projecting an image on a screen, the improvement comprising a strap for connecting a screen mounting surface to said cube, said strap including a groove adjacent said screen mounting surface into which a bonding compound is injected for securing said screen mounting surface to said video cube, and wherein said groove is located on an outside surface of said strap so as not to interfere with image light rays projected onto said screen, thereby preventing first order edge reflections.

2. The improvement of claim 1, wherein said strap further includes a roughened inside surface for absorbing light rays and thereby preventing second order edge reflections.

3. The improvement of claim 1, wherein said groove is a notch.

4. The improvement of claim 1, wherein said bonding compound is methylene chloride.

* * * * *